United States Patent

[11] 3,594,690

[72] Inventors Malte Ljungner
Vasteras;
Lembit Jaakso, Hokasen; Arne Johansson, Vasteras, all of, Sweden
[21] Appl. No. 787,178
[22] Filed Dec. 26, 1968
[45] Patented July 20, 1971
[73] Assignee Allmanna Svenska Elektriska Aktiebolaget
Vasteras, Sweden
[32] Priority Dec. 29, 1967
[33] Sweden
[31] 17972/67

[54] CONNECTION SOCKET
5 Claims, 8 Drawing Figs.

[52] U.S. Cl. 339/19, 200/51.12, 339/176, 339/219
[51] Int. Cl. H01r 31/08, H01r 17/20, H01r 9/08
[50] Field of Search 339/19, 176 M, 219 S; 200/51.12, 51.13

[56] References Cited
UNITED STATES PATENTS

| | | | |
|---|---|---|---|
| 2,746,023 | 5/1956 | Tyzack | 339/176 |
| 3,470,525 | 9/1969 | Jaaksoo et al. | 339/217 |

*Primary Examiner*—James A Leppink
*Attorney*—Jennings Bailey, Jr.

ABSTRACT: A socket for mounting and connecting electrical devices having pin outputs is formed of a lid and a boxed-shaped bottom part. The lid has a plurality of holes arranged in pairs for receiving pins, while the bottom part has a hollow opposite each pair of holes for receiving a connecting element formed with pairs of tongues for detachable locking contact elements inserted from the lower side of the bottom part. Between rows of pairs of holes on the top part are three holes arranged in a vertical row, opening into a recess in the bottom side of the bottom part. A short-circuiting device insertable into the recess has a pair of contacts for receiving pins inserted through the two outermost of the three holes and a movable short-circuiting contact engageable by a pin passing through the central hole.

INVENTORS
MALTE LJUNGNER
LEMBIT JAAKSOO
ARNE JOHANSSON
BY Jennings Bailey, Jr.

INVENTORS
MALTE LJUNGNER
LEMBIT JAAKSOO
ARNE JOHANSSON
BY
Jennings Bailey, Jr

INVENTOR.
MALTE LJUNGNER
LEMBIT JAAKSOO
BY ARNE JOHANSSON

CONNECTION SOCKET

BACKGROUND OF THE INVENTION

1. Field of the Invention

The invention relates to a socket for mounting electrical apparatus having pin outputs.

2. The Prior Art

Sockets for mounting and connecting electrical apparatus having pin outputs, such as relays, circuit cards and the like, are usually made with embedded contact sockets corresponding to the pin outputs. At the rear side of the socket the contact sockets are provided with soldering lugs for connection of the conductors to be connected to the apparatus arranged on the socket. The conductors are then connected by means of soldering, which in many cases may be difficult to accomplish. If the soldering lugs are close together there is a risk that adjacent soldering may melt while another conductor is being soldered. Furthermore, the lugs are often so close together that it is difficult to solder without damaging the conductors.

Another method of connecting the conductors is to screw them in, but in this case there is a risk of the conductors becoming loose because of yielding in the material of the conductor.

SUMMARY OF THE DISCLOSURE

The present invention relates to a socket for mounting and connecting apparatus having pin outputs, for example relays, circuit cards and the like, in which the above-mentioned disadvantages are eliminated. The socket consists of a box-shaped bottom part and an upper part constructed as a lid. The upper part has a number of holes arranged in pairs in rows for the pins on the apparatus and the bottom part has a hollow opposite each pair of holes in the upper part, which hollow contains a connecting element having tongues arranged in pairs for detachable locking of contact elements insertable from the lower side of the bottom part which cooperate with the pins on the apparatus.

The advantages obtained with the socket according to the invention will be shown in connection with the description of the details thereof particularly, the advantages obtained that apparatus having pin outputs, for example relays, circuit cards and the like, can be readily plugged in and connected to a current source without danger of making a mistake in the connections.

DESCRIPTION OF THE PREFERRED EMBODIMENTS

Figure 1:
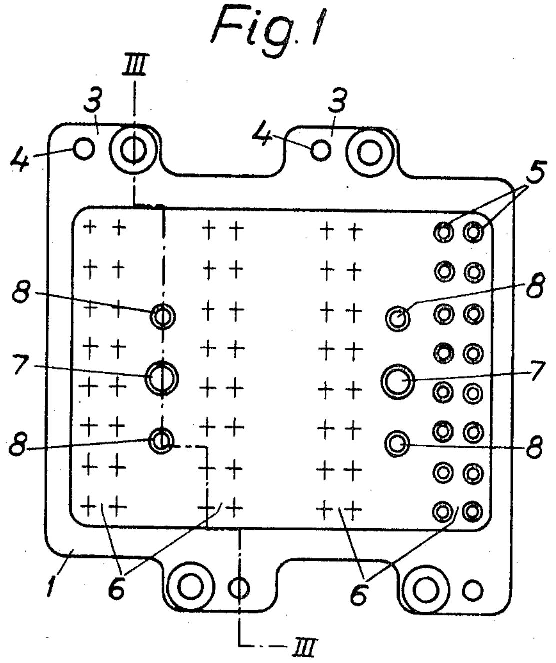
FIG. 1 shows the upper part of the socket seen from above.
Figure 2:
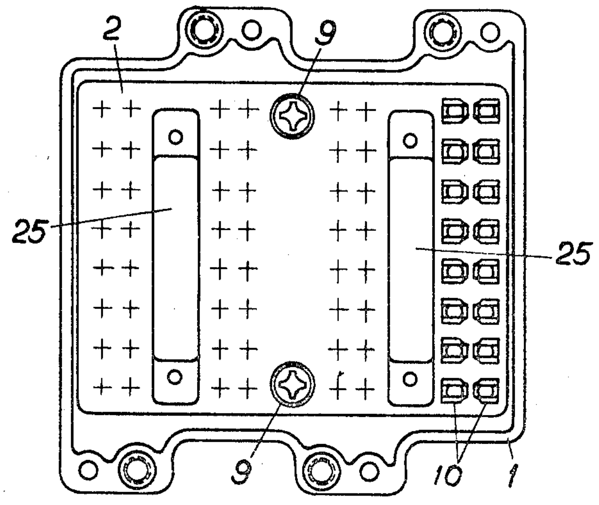
FIG. 2 shows the bottom part seen from below.
Figure 3:
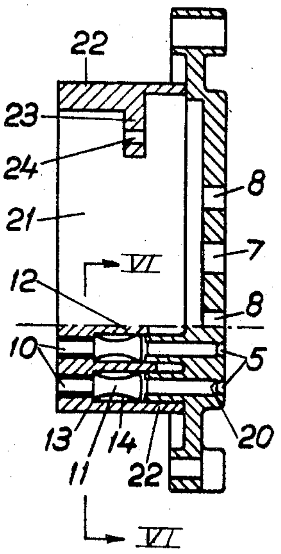
FIG. 3 is a cross section through the socket along the line III–III in FIG. 1.

In FIGS. 1, 2 and 3 the upper part constructed as a lid is designated 1 and in FIGS. 2 and 3 the box-shaped bottom part is designated 2. The upper part is provided on two opposite sides with lugs 3 having screw holes for attachment of the socket to a stand or the like. FIG. 1 shows how the upper part is provided with a number of rows 6 of holes 5 arranged in pairs for pin outputs on the apparatus to be mounted on the socket. In the embodiment shown the socket is designed to fit a special module system where several units can be fitted together, both in horizontal and vertical direction, to form a larger unit. Larger and smaller module units can also be made fitting into the same system. Only one row of holes is shown in its entirety, the rest being marked with crosses.

Between two rows of pairs of holes are three additional holes. The middle one of these 7 is intended for a control pin of insulating material on the relay which, when the relay is mounted on the socket, operates a short circuit device inside the bottom part. This device will be further described later. The other two holes 8 are intended to contain two pins on the relay socket which, when the relay is mounted on the socket, are connected to current-supplying contacts on the previously mentioned short-circuiting device. The two holes 8 are arranged symmetrically in relation to the hole 7 but all three holes are placed asymmetrically on the socket, the distance from the hole 7 to the lower edge of the socket being less than the distance from the same hole to the upper edge of the socket. This means that the relay cannot be inserted incorrectly in the socket. The two socket parts are held together for example by means of screws 9 which are screwed from the lower side of the bottom part into holes on the lower part of the upper part. The two screws 9 are shown in FIG. 2.

FIG. 2 shows the socket shown from below with the bottom part 2 and the parts of the upper part 1 projecting outside its edges. The bottom part is also provided with rows of pairs of holes 10 which are situated opposite the holes 5 in the upper part. The holes in the bottom part have a somewhat different shape, the side edges situated furthest away from each other in a pair of holes being straight in order to make room for a tool, the appearance and function of which will be described later.

Inside the bottom part is a hollow 11 for each pair of holes 10, as seen in FIG. 3. The hollow may be considered as a somewhat expanded extension of the holes 10, common to one pair of holes. Between each pair of holes 10 is a wall 12, seen in FIG. 3. There is also a wall running parallel to the rows of holes and in connection with the straight side edges of the holes, which forms a limit for the hollows 11 in a direction perpendicular to the longitudinal direction of the rows of holes. The hollows 11 are limited at the part facing the rear side of the socket by shoulders 13 on the walls 12 and these shoulders form supports for a connecting element 14 arranged in each hollow, see FIG. 3. The connecting element is shown in more detail in FIGS. 4*a* and 4*b*.

Figure 4B:
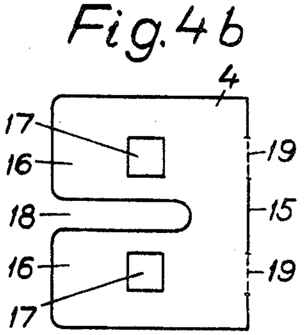
FIGS. 4*a*, 4*b* and 4*c* show the connecting element in side elevation, cross section, and top plan view, respectively, and FIG. 5 the short-circuiting device used in the socket.
Figure 4A:
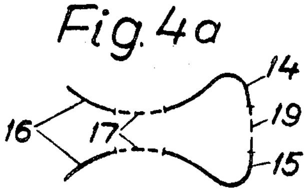

FIGS. 4*a* and 4*b* show in larger scale the appearance of the connecting element 14 which is inserted in each of the hollows 11. The connecting element is made of a bronze having good resilience and consisting of a spacer 15 and two pairs of tongues 16 extending from the spacer. FIG. 4*a* shows how the tongues are bent so that within each pair two smooth convex surfaces face each other. Each of the tongues has a rectangular opening 17 at the top of the smooth convex surfaces. The pairs of tongues are separated by a groove 18 which is shown in FIG. 4*b*. The notches 17 serve as stops for a contact insertable from the left in FIGS. 3 and 4*a*, 4*b*, thus from the rear side of the socket, the contact preferably being female with a diameter somewhat greater than the least distance between the tongues in a pair and having a peripheral flange. When the contact has been inserted so far that the flange fits into the notches 17, the contact is locked to the connecting element and cannot easily be withdrawn. The free ends of the connecting element rest against the shoulders 13 in the hollow 11 and because the convex tongues 16 are pressed somewhat apart by the contact it will be held even more tightly against the shoulders 13. In the spacer 15 are two holes 19 opposite the notches 17 in the resilient tongues. The diameter of these holes is greater than the outer diameter of the inserted contact so that the free end of the contact in inserted and locked position lies near to the front edge of the upper part at the surface marked 20 in FIG. 3. The contact thus inserted and locked fits the contact pins on the relay to be mounted on the socket. The contact is attached to a conductor which fits into one of the holes 10 on the rear side of the socket.

The contact with the conductor can be released from the socket by means of the tool mentioned in the introduction. This consists of a thin plate of insulating material and its width should be somewhat greater than the diameter of the contact flange. The tool is inserted from the rear side of the socket between the contact and the straight edge of the hole 10. When the tool reaches the two tongues 16, the tongues are pressed apart so that the distance between them becomes greater than the flange diameter of the contact. The flange thus releases its grip in the holes 17 and the conductor with the contact can be withdrawn.

The arrangement with two pairs of tongues 16 which are electrically connected to each other by means of the space 15 makes it possible to connect two cables to the same electrical point and, when the relay is withdrawn from the bottom plate, any series feeding to other connecting points can continue uninterrupted regardless of whether the relay is provided with one or two pins per connecting point.

Between two associated rows of pairs of holes in the bottom part is a recess 21, seen in FIG. 3. This recess goes right through the bottom part and a lug 23 with a screw hole 24 projects into the recess from each sidewall 22 of the bottom part. The recess is intended to contain a short-circuiting device 25 shown in FIG. 5. The casing of short-circuiting device is provided with two lugs 26 having screw holes 27 to fit the screw holes 24 in the bottom part. The device is intended to be connected from the rear side of the bottom part to the secondary winding of a current transformer by means of conductors provided with a female contact 28 held in position by means of a previously described connecting member 14. The free end of the contact is situated immediately below one of the holes 8 in FIG. 1 so that a current-feeding pin arranged on the apparatus to be attached to the socket is engaged in the female contact. In a central hollow in the short-circuiting device opposite hole 7 is a short-circuiting element 29 which is pressed by a spring 30 against two contact elements 31 abutting the female contact 28 and which, in the position shown in the drawing, abut the short-circuiting element as well and thus effect a short circuit between the two female contacts 28. The apparatus to be connected has a control pin of insulating material arranged between the current pins. When the apparatus is inserted in the socket the current pins fit into the female contacts and the control pin passing through hole 7 presses the short-circuiting element 29 upwards in the drawing so that the short circuit ceases and the apparatus receives current. When the apparatus is removed, a short circuit occurs before the current pins leave the female contacts.

When disconnecting electrical apparatus which are directly connected to a current transformer there is a great risk that the secondary circuit of the current transformer will be opened involuntarily. This is the case especially with apparatus of the plug-in type, for example, relays.

Figure 5:
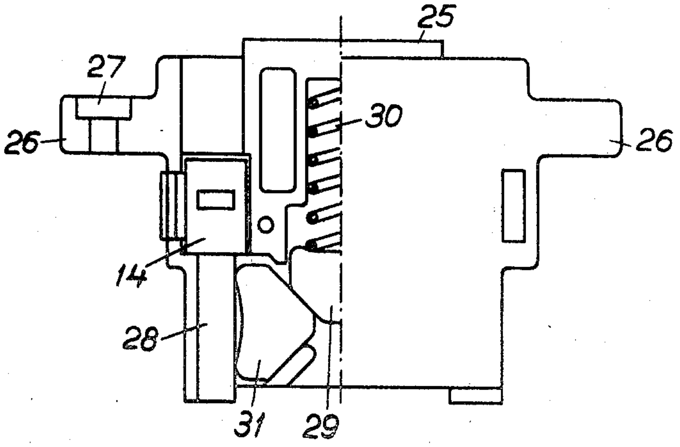
Figure 6:
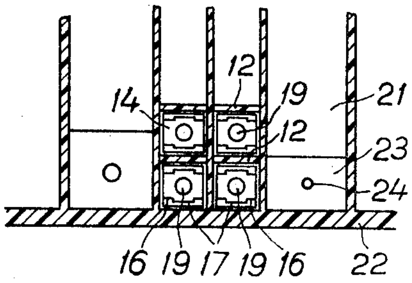
FIG. 6 is a cross section on the line VI–VI of FIG. 3.
Figure 4C:
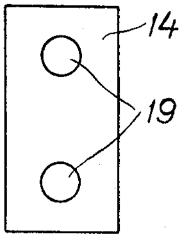

With a device according to FIG. 5, an automatic short circuiting of the secondary circuit is obtained when the apparatus is removed. The short circuiting is brought about before the apparatus is removed and the risk of damaging the current transformer is completely eliminated. Such a device is shown in somewhat modified form in U.S. Pat. No. 3,512,043.

We claim:

1. Socket for mounting and connecting apparatus having pin outputs, comprising an upper part constructed as a lid and a box-shaped bottom part, in which the upper part (1) has a number of holes (5) arranged in pairs in rows for receiving the pins on the apparatus, the bottom part (2) has a hollow (11) opposite each pair of holes in the upper part, which hollow contains a connecting element (14) having tongues (16) arranged in pairs for detachable locking of contact elements insertable from the lower side of the bottom part, the upper part having between two rows of pairs of holes belonging to the same apparatus position three holes (7,8) which are situated in a row parallel to said rows of pairs of holes, the middle one (7) of the three holes receiving a control pin arranged on the apparatus and the other two holes (8) receiving pins for the supply of current to the apparatus.

2. Socket according to claim 1, in which the row of three holes (7,8) is arranged asymmetrically in relation to the adjacent two rows of pairs of holes to prevent the apparatus from being incorrectly inserted in the socket.

3. Socket according to claim 1, in which in the bottom part, between two associated rows of hollows for connecting elements, is a recess for a current-feeding and short-circuiting device including means engageable with a control pin on the apparatus arranged on the socket and which was contact devices for the connection of conductors from a current source, which conductors are insertable into the device from the rear of the socket.

4. Socket according to claim 1, in which the hollow for the connecting element is divided by a flange extending upward from the lower edge of the bottom part to control the contact element, said flange being parallel to the rows of pairs of holes and arranged between two such rows of holes and the height of the flange is approximately half the distance between the lower edge of the bottom part and the upper edge of the hollow.

5. Socket according to claim 1, in which the connecting element is common for contact elements inserted in one pair of holes consisting of contact pins and contact sockets, the connecting element providing holding members for two associated contact elements and also forming a connecting member between contact elements belonging to two different holes of the pairs of holes.